(12) United States Patent
Wolf

(10) Patent No.: US 9,469,355 B2
(45) Date of Patent: Oct. 18, 2016

(54) MOTOR VEHICLE WITH AN ADJUSTABLE AIR-GUIDING ELEMENT

(71) Applicant: Dr. Ing. h. c. F. Porsche Aktiengesellschaft, Stuttgart (DE)

(72) Inventor: Thomas Wolf, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/298,226

(22) Filed: Jun. 6, 2014

(65) Prior Publication Data

US 2015/0353149 A1 Dec. 10, 2015

(30) Foreign Application Priority Data

Jun. 6, 2013 (DE) ................. 10 2013 105 843

(51) Int. Cl.
*B62D 35/02* (2006.01)
*B62D 35/00* (2006.01)

(52) U.S. Cl.
CPC ............. *B62D 35/02* (2013.01); *B62D 35/007* (2013.01)

(58) Field of Classification Search
CPC .... B62D 35/00; B62D 35/02; B62D 35/007; B62D 37/00; B62D 37/02

USPC .......................................... 296/180.1–180.5
See application file for complete search history.

(56) References Cited

U.S. PATENT DOCUMENTS

| | | | | |
|---|---|---|---|---|
| 4,379,582 A | * | 4/1983 | Miwa | 296/180.5 |
| 4,455,045 A | * | 6/1984 | Wheeler | 296/181.5 |
| 4,772,062 A | * | 9/1988 | Janssen et al. | 296/180.5 |

FOREIGN PATENT DOCUMENTS

| | | |
|---|---|---|
| DE | 3409667 | 9/1985 |
| DE | 102004032733 | 2/2006 |
| DE | 102011103787 | 12/2012 |
| FR | 2856974 | 1/2005 |
| FR | 2880323 | 7/2006 |

OTHER PUBLICATIONS

German Search Report of Feb. 24, 2014.

* cited by examiner

*Primary Examiner* — H Gutman
(74) *Attorney, Agent, or Firm* — Gerald E. Hespos; Michael J. Porco; Matthew T. Hespos

(57) ABSTRACT

A rear region of a motor vehicle has an underbody with at least one air-guiding element that is adjustable from a rest position into various operative positions. One operative position increases negative lift and another operative position reduces aerodynamic drag. The air-guiding element is adjustable into the individual operative positions via a central, transversely arranged pivot axis.

11 Claims, 3 Drawing Sheets

MOTOR VEHICLE WITH AN ADJUSTABLE AIR-GUIDING ELEMENT

CROSS REFERENCE TO RELATED APPLICATION

This application claims priority under 35 USC 119 to German Patent Appl. No. 10 2013 105 843.4 filed on Jun. 6, 2013, the entire disclosure of which is incorporated herein by reference.

BACKGROUND

1. Field of the Invention

The invention relates to a motor vehicle with an adjustable air-guiding element.

2. Description of the Related Art

FR 2 856 974 A1 discloses an adjustable air-guiding element in the region of a vehicle rear and forming part of an underbody or to an underbody covering.

It is the object of the invention to provide a motor vehicle with an adjustable air-guiding element in conjunction with a rear diffuser to influence vehicle forces and/or aerodynamic properties of the vehicle.

SUMMARY OF THE INVENTION

The invention relates to a vehicle that combines a rear diffuser and an associated air-guiding element to obtain higher negative lift forces in a targeted manner and to achieve an optimum adaptation of the aerodynamic properties of the motor vehicle to the driving state. More particularly, at least one holding and adjustment device is below an underbody or an underbody covering and can extend at least one air-guiding element from an upper rest position down toward the ground contact area of the vehicle. The holding and adjusting device also can cause the air guiding element to rise in the manner of a diffuser counter to the direction of travel. The at least one air-guiding element that is in an extended position also can be adjusted about an axis of rotation into a plurality of operative positions. The axis of rotation preferably is in the center of the air-guiding element and runs transversely. This pivotability of the air-guiding element and of the vehicle underbody rising in the manner of a diffuser makes it possible to vary both the negative lift of the rear axle and the coefficient of aerodynamic drag of the vehicle.

The holding and adjustment device can move the air-guiding element substantially vertically between a rest position where the air-guiding element bears against the underbody and a first operative position where the air-guiding element is parallel to and spaced from the underbody. Negative lift is obtained in this first operative position, thus resulting in improved driving dynamics during rapid travel and on a racing track.

The holding and adjustment device also can pivot the air-guiding element about the axis of rotation from the downwardly extended first operative position into a second operative position in which the air-guiding element is set at an angle to the underbody with a front edge of the air-guiding element bearing against the underbody. This second operative position results in reduced aerodynamic drag and brings about low fuel consumption.

A control element preferably is provided to control the holding and adjustment device for pivoting the air-guiding element into positions between the two operative positions, the rest position and intermediate positions. The control element activates the air-guiding element depending on the current driving state and determines the individual positions that can be provided.

The vehicle preferably has an underbody or an underbody covering that rises from a region of the rear axle of the motor vehicle to the rear end of the vehicle to form a rear diffuser with a diffuser angle of approximately $\geq 25°$ between the underbody and a horizontal. This diffuser angle enables the aerodynamic properties of the motor vehicle to be influenced optimally by the adjustable air-guiding element.

The air-guiding element also preferably is arranged below the underbody covering to overlap approximately $\frac{1}{3}$ to $\frac{1}{2}$ of the length of the underbody covering of the diffuser. This diffuser angle and the length of the air-guiding element result in maximum effectiveness of the rear diffuser on the vehicle.

The air-guiding element preferably is arranged in the rear region of the diffuser so that a rear edge of the air-guiding element is substantially flush with an edge of a rear-part of the vehicle.

The air-guiding element may be divided in the longitudinal direction and the individual elements may be activated jointly or separately. The rear diffuser according to this embodiment preferably comprises air-guiding elements that form lower wings in a longitudinal channel of the underbody and may be adjustable individually or jointly about a transverse axis within the longitudinal channel to achieve different operative positions.

In summary, the invention enables negative lift forces from the rear diffuser and air-guiding element to accumulate. More particularly, the combination of the rear diffuser with the air-guiding element enables higher negative lift forces than can be realized by using a diffuser or air-guiding element by itself. The air-guiding element additionally deflects the airflow up. Thus, the combination of the rear diffuser and the air-guiding element enables steeper and shorter diffusers to be used without the flow separating. The pivotability of the air-guiding element about the transverse axis makes it possible to optimally influence the setting angle and the outflow direction of the air. The pivotability of the air-guiding element permits a reduction in the lifting effect of the rear axle or in the aerodynamic drag. By this means, the aerodynamic properties of a motor vehicle can be adapted to match requirements.

Exemplary embodiments of the invention are illustrated in the drawings and are described in more detail below.

DETAILED DESCRIPTION OF THE PREFERRED EMBODIMENTS

Figure 1:
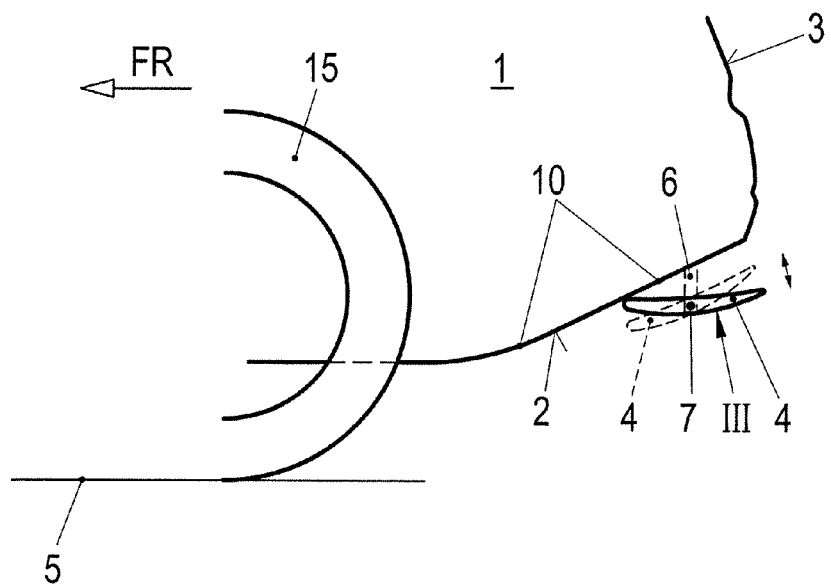
FIG. 1 is a side view of a vehicle with a rear diffuser shown in two operative positions.

A motor vehicle 1 comprises an adjustable air-guiding element 4 or plural air-guiding elements 4a, 4b on the underbody 2 or underbody covering in the region of a vehicle rear 3.

The underbody 2 or underbody covering rises in the manner of a diffuser counter to the direction of travel FR, and the air-guiding element 4 is below the underbody 2 or underbody covering. Additionally, the air-guiding element 4 is extendable from an upper rest position I down with respect to the ground contact area 5 of the vehicle into operative positions II and III that have different settings.

Figure 3:
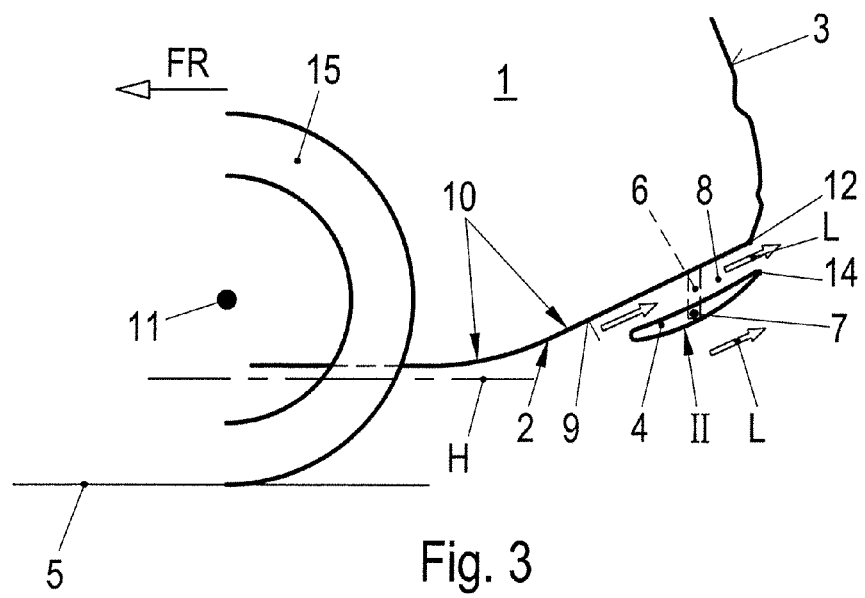
FIG. 3 is a side view of the vehicle with an air-guiding element extended parallel to the underbody in a first operative position.
Figure 4:
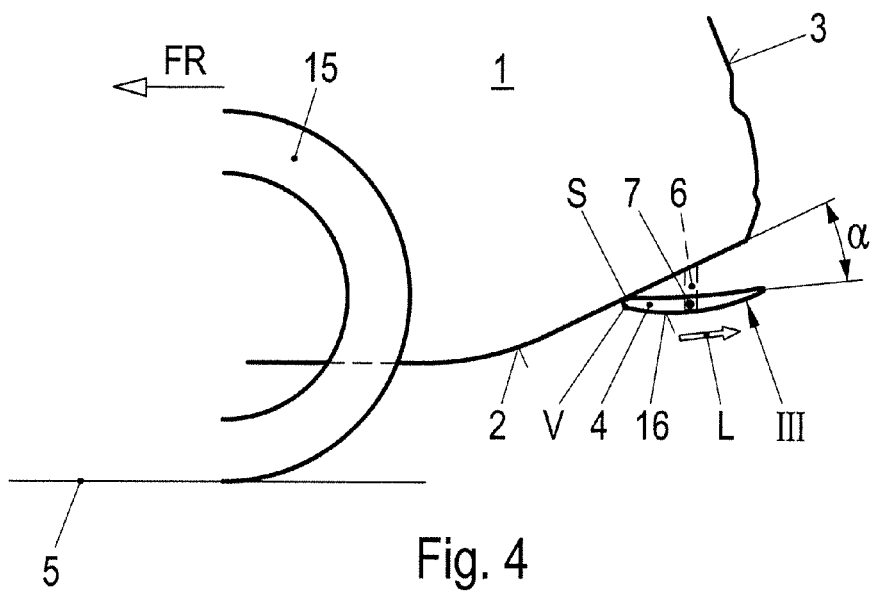
FIG. 4 is a side view of the vehicle with an air-guiding element pivoted at an angle with respect to the rear diffuser, in a second operative position.

In these extended positions, the air-guiding element 4 is mounted in a holding and adjustment device 6 and is pivotable about an axis of rotation 7 into the operative positions II and III (FIGS. 3 and 4). The axis of rotation 7 is in the center of the air-guiding element 4 and runs transversely.

Figure 2:
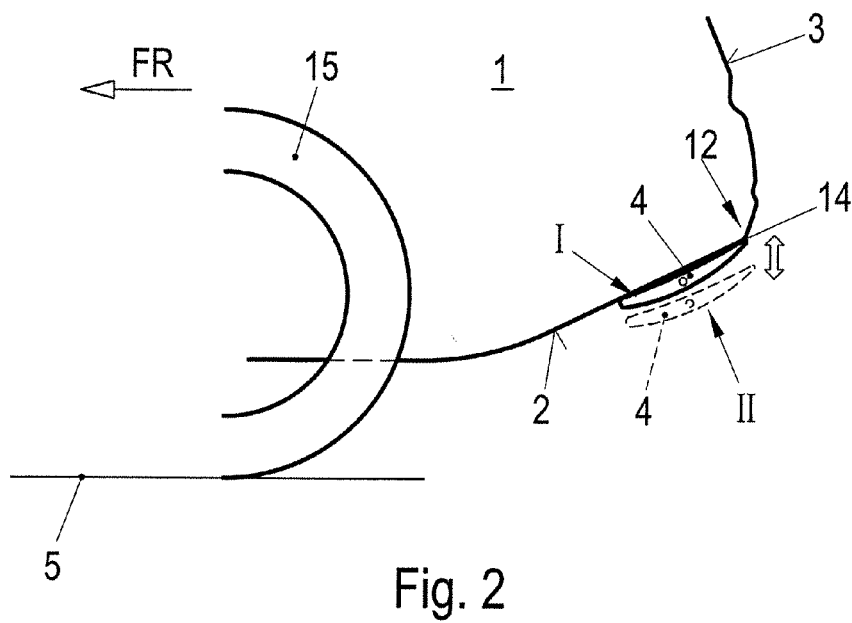
FIG. 2 is a side view of the vehicle of FIG. 1 showing a retracted rest position and extended operative position of the air-guiding element.

The air-guiding element 4 is movable via the device 6 from the rest position I bearing against the underbody 2 (FIG. 2) vertically down to the first operative position II where the air-guiding element 4 is parallel to the underbody 2. The first operative position II forms a negative lift position in which an air gap 8 is formed between the air-guiding element 4 and a diffuser surface 9 of the underbody 2 (FIG. 3). The air flows up past the diffuser 10 and past the air-guiding element 4, with air flowing around the air-guiding element 4 on all sides. Thus, the diffuser 10 and the air-guiding element 4 exert a force on the air that results in a downward reaction force with increased negative lift forces arising at the rear axle 11.

The air-guiding element 4 can be pivoted from the parallel first operative position II into the second operative position III (FIG. 4), in which the air-guiding element 4 is set at an angle α with respect to the underbody 2. In the operative position III, the air-guiding element 4 is oriented approximately horizontally or set parallel to the ground contact area 5 of the vehicle. There is only a small gap S, if any at all, between the air-guiding element 4 and the diffuser surface 9. The air L flows off virtually parallel to the ground contact area 5 of the vehicle. There is no deflection of the air and therefore no reaction force arises. Hence, a reduced aerodynamic drag is achieved in this position.

The air-guiding element 4 is pivotable into at least one third operative position between the first operative position II and the second operative position III. The air-guiding element 4 can be adjusted via a control element that acts depending on the current driving state.

The underbody 2 preferably has an underbody covering 2 that rises from the rear axle 11 a lower edge 12 of the vehicle rear 3 and forms the rear diffuser 10. A diffuser angle of approximately ≥25° is formed between the underbody covering 2 and a horizontal H by the rising underbody covering (FIG. 3).

The air-guiding element 4 arranged below the underbody 2 or the underbody covering has approximately a length of ⅓ to ½ of the length of the diffuser 10, preferably with a length of the diffuser 10 being 300 to 500 mm.

The air-guiding element 4 preferably is arranged in the rear region of the diffuser 10 so that a rear edge 14 of the air-guiding element 4 is flush with the lower edge 12 (FIG. 3) and the air-guiding element 4 extends with the rear diffuser 10 over the entire width between the rear wheels 15 of the vehicle 1.

Figure 5:
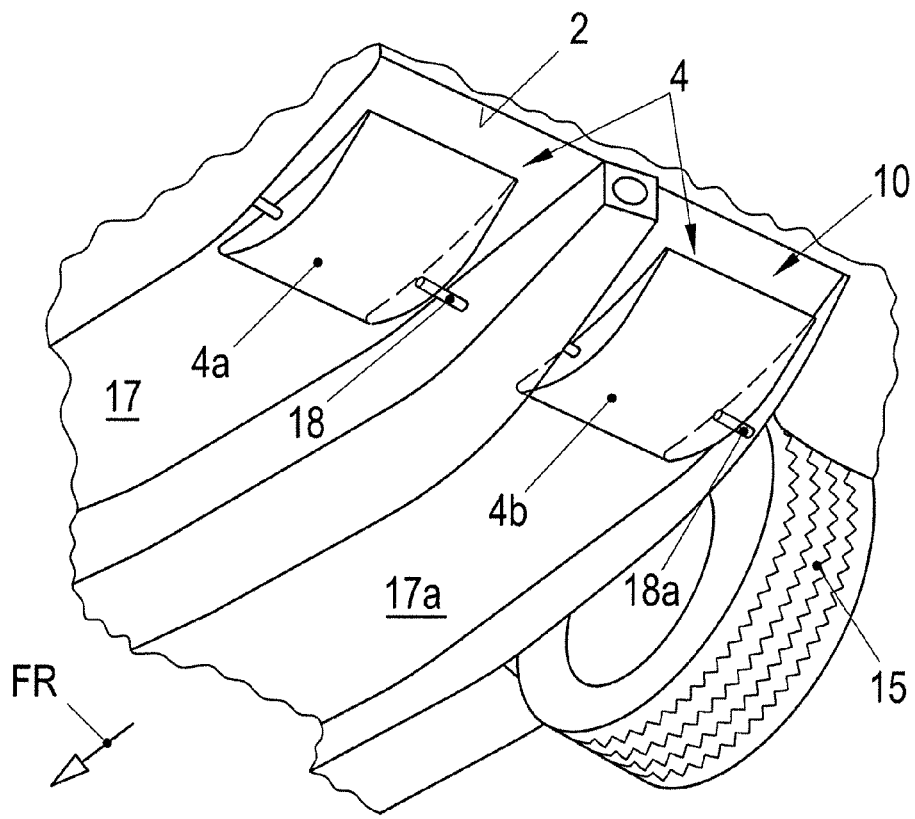
FIG. 5 is a bottom perspective view of a rear diffuser with an air-guiding element divided in two and pivotable in longitudinal channels of the underbody.

According to a further embodiment according to the invention, the rear diffuser 10 can be divided in the longitudinal direction. In this case, the rear diffuser 10 has the air-guiding element 4 defined by two air-guiding elements 4a, 4b forming lower wings in a longitudinal channel 17, 17a of the underbody 2. The air-guiding elements 4a, 4b are adjustable about a transverse axis 18, 18a within the longitudinal channel 17, 17a with respect to the channel base, as is illustrated in FIG. 5. A plurality of operative positions can be set by the pivotability of the two air-guiding elements 4a, 4b.

The air-guiding element 4 preferably has of a wing profile with a convex lower surface 16. The upper surface 17 of the air-guiding element 4 is adapted to the shape profile of the underbody 2 or to the underbody covering so that the air-guiding element 4 bears tightly against the latter in the rest position I.

What is claimed is:

1. A motor vehicle with a vehicle rear, a rear wheel and an underbody or an underbody covering extending to the vehicle rear, the underbody or the underbody covering rising toward the vehicle rear to define a diffuser, the diffuser having a front end rearward of the rear wheel and a rear end at the vehicle rear and defining a diffuser length extending from the front end to the rear end of the diffuser, the motor vehicle comprising: at least one adjustable air-guiding element having a front edge spaced rearward of the front end of the diffuser by a distance at least equal to one-half the diffuser length and a rear edge in proximity to the vehicle rear and substantially adjacent the underbody or the underbody covering, and a holding and adjustment device connected to the air-guiding element and being configured for extending the air-guiding element from an upper rest position substantially adjacent the diffuser down toward a ground contact area on which the vehicle is supported, the holding and adjustment device further being configured for moving the air guiding element into a plurality of operative positions by pivoting the air-guiding element about an axis of rotation arranged substantially in a center of the air-guiding element and running transverse to a direction of travel.

2. The motor vehicle of claim 1, wherein the air-guiding element is movable via the holding and adjustment device from the rest position bearing against the underbody vertically down into a first of the operative positions, in which the air-guiding element is substantially parallel to and spaced from the underbody.

3. The motor vehicle of claim 2, wherein the air-guiding element is pivotable about the axis of rotation from the downwardly extended first operative position into a second of the operative positions, in which the air-guiding element is at an angle to the underbody and the front edge of the air-guiding element substantially bears against the underbody.

4. The motor vehicle of claim 3, wherein the air-guiding element is adjustable in at least one third operative position that is pivotable between the first operative position and the second operative position.

5. The motor vehicle of claim 1, wherein the underbody or the underbody covering rises from a rear axle of the motor vehicle substantially to a lower edge of the vehicle rear and forms the rear diffuser with a diffuser angle of approximately ≥25° formed between the underbody and a horizontal.

6. The motor vehicle of claim 1, wherein a distance from the front edge to the rear edge of the air-guiding element is approximately ⅓ to ½ of the length of the diffuser.

7. The motor vehicle of claim 1, wherein the rear edge of the air-guiding element is substantially flush with a lower edge of the vehicle rear.

8. The motor vehicle of claim 1, wherein the air-guiding element extends over an entire width between the rear wheels of the vehicle.

9. The motor vehicle of claim 1, wherein the air-guiding element has a wing profile with a convex lower surface and an upper surface that is nestable with the underbody covering.

10. The motor vehicle of claim 1, wherein the rear diffuser has longitudinal channels on the underbody and the at least one air-guiding elements comprises plural air-guiding elements disposed respectively in the longitudinal channels on the underbody and being adjustable about a transverse axis within the longitudinal channel.

11. The motor vehicle of claim 1, further comprising a control element that is operable to control movement of the air-guiding element into the individual operative positions and intermediate positions depending on a driving state of the vehicle.

\* \* \* \* \*